United States Patent
Peters et al.

(10) Patent No.: US 12,128,971 B2
(45) Date of Patent: Oct. 29, 2024

(54) DETERMINING EFFECTIVE TRAILER WHEELBASE LENGTH

(71) Applicant: ISEE, Inc., Cambridge, MA (US)

(72) Inventors: Zachary Peters, Cambridge, MA (US); Gregory J. Paraskos, Medford, MA (US)

(73) Assignee: ISEE, Inc, Cambridge, MA (US)

( * ) Notice: Subject to any disclaimer, the term of this patent is extended or adjusted under 35 U.S.C. 154(b) by 302 days.

(21) Appl. No.: 17/567,771

(22) Filed: Jan. 3, 2022

(65) Prior Publication Data

US 2022/0212732 A1 Jul. 7, 2022

Related U.S. Application Data (60) Provisional application No. 63/133,395, filed on Jan. 3, 2021.

(51) Int. Cl.
| | | |
|---|---|---|
| *B60D 1/01* | (2006.01) | |
| *B60D 1/62* | (2006.01) | |
| *B62D 53/08* | (2006.01) | |
| *G01B 21/04* | (2006.01) | |
| *G01B 21/06* | (2006.01) | |
| *G01B 21/22* | (2006.01) | |

(52) U.S. Cl.
CPC ........... *B62D 53/0821* (2013.01); *B60D 1/62* (2013.01); *G01B 21/045* (2013.01); *G01B 21/22* (2013.01)

(58) Field of Classification Search
CPC ...... B62D 53/0821; B62D 1/62; B62D 1/015; G01B 21/045; G01B 21/22; G01B 21/06
USPC .............................................................. 701/1
See application file for complete search history.

(56) References Cited

U.S. PATENT DOCUMENTS

| | | | |
|---|---|---|---|
| 2002/0168254 A1* | 11/2002 | Oliver ....................... | B60P 1/16 414/382 |
| 2007/0162211 A1* | 7/2007 | Seksaria ............... | B60W 10/08 701/51 |
| 2013/0164105 A1* | 6/2013 | Scherf ..................... | B60P 1/48 414/547 |
| 2017/0036712 A1* | 2/2017 | Deardorff ............... | B60D 1/155 |
| 2019/0385461 A1* | 12/2019 | Blomstrand ............. | B60D 1/44 |
| 2021/0053407 A1* | 2/2021 | Smith ...................... | B60D 1/64 |
| 2021/0070362 A1* | 3/2021 | Xu ......................... | B62D 15/025 |
| 2021/0253014 A1* | 8/2021 | Ishii ....................... | B60P 1/162 |
| 2021/0261032 A1* | 8/2021 | Hayes ..................... | B60P 1/16 |

* cited by examiner

*Primary Examiner* — Ian Jen
*Assistant Examiner* — Hossam M Abd El Latif
(74) *Attorney, Agent, or Firm* — Prince Lobel Tye LLP (57) ABSTRACT

Systems and methods for estimating a length of at least a portion of a trailer that is carried by a tractor. The tractor has a fifth wheel coupling that is configured to be connected to a kingpin of the trailer. The height of the fifth wheel coupling is adjustable by adjustment of an angle of a boom that carries the fifth wheel coupling. The angle of the boom is determined by a sensor. The angle of the trailer is determined by a sensor. The length of at least a portion of the trailer is calculated based on the boom length, the determined boom angle, and the determined trailer angle.

22 Claims, 9 Drawing Sheets

FIG. 8

DETERMINING EFFECTIVE TRAILER WHEELBASE LENGTH

CROSS-REFERENCE TO RELATED APPLICATION

This application claims priority of Provisional Application 63/133,395 filed on Jan. 3, 2021, the entire disclosure of which is incorporated herein by reference for all purposes.

BACKGROUND

This disclosure relates to determining the effective wheelbase length of a trailer that is connected to/carried by a tractor.

Autonomous systems are used to move trailers through trailer yards and other locations. When the trailer is being moved the effective wheelbase length (which may be generally defined as the distance between the trailer kingpin pivot point at the fifth wheel coupling and the rear wheels) needs to be known in order for the autonomous system to accurately calculate the trailer's path so that the trailer arrives at the desired end point. Trailer lengths vary, are not entirely standardized, and do not always accurately match the nominal trailer length. Also, the effective length of the trailer's wheelbase can dynamically change as the trailer is moved, depending on factors such as the terrain over which the trailer is being moved and the load carried by the trailer.

SUMMARY

Aspects and examples of the present disclosure are directed to systems and methods for determining the effective wheelbase length of a trailer that is connected to a tractor. An autonomous system can be configured to calculate the effective length of the trailer wheelbase after the trailer has been picked up by the tractor. This effective wheelbase length can be used by an autonomous driving system to properly maneuver the tractor/trailer combination. In some examples the effective trailer wheelbase length is determined from the length of the tractor's boom that carries the trailer via a fifth wheel coupling at the end of the boom, the angle of the boom relative to the horizontal, and the angle of the trailer relative to the horizontal. In some examples the boom angle and trailer angle are determined at multiple different heights of the fifth wheel coupling. In some examples the effective wheelbase length is based on boom angle as well as the derivatives of the boom angle and the trailer angle. In an example the two angles are determined using sensors mounted to the tractor (e.g., to the boom and the fifth wheel coupling). The boom length is specified by the boom manufacturer, or can be measured and saved in system memory for use by a processor that is used to calculate the effective trailer wheelbase length.

All examples and features mentioned below can be combined in any technically possible way.

In one aspect, a method of estimating an effective wheelbase length of a trailer that is carried by a tractor and is configured to be moved along the ground, wherein the tractor comprises a fifth wheel coupling that is configured to be connected to a kingpin of the trailer, wherein a height of the fifth wheel coupling is adjustable by adjustment of an angle of a boom that carries the fifth wheel coupling and wherein the boom has a length, includes determining an angle of the boom, determining an angle of the trailer, and calculating the effective wheelbase length based on the determined boom angle, the determined trailer angle, and the boom length.

Some examples include one of the above and/or below features, or any combination thereof. In an example the trailer comprises a set of rear wheels carried by a rear axle, and the effective wheelbase length comprises the trailer wheelbase length from the kingpin to a location proximate the rear axle. In an example determining an angle of the boom comprises measuring the boom angle at a plurality of different heights of the fifth wheel coupling. In an example determining an angle of the trailer comprises measuring the trailer angle at a plurality of different heights of the fifth wheel coupling.

Some examples include one of the above and/or below features, or any combination thereof. In an example determining an angle of the boom comprises measuring the boom angle at a plurality of different heights of the fifth wheel coupling, determining an angle of the trailer comprises measuring the trailer angle at the same plurality of different heights of the fifth wheel coupling, and the effective wheelbase length is calculated based on the length of the boom, the plurality of measured boom angles, and the plurality of measured trailer angles. In an example one or both of a linear fit and a second order polynomial fit is determined of a relationship between the determined trailer angles and the determined boom angles, at multiple different heights of the fifth wheel coupling. In an example a slope of the fit is determined, and the effective wheelbase length is determined based on the boom length and the determined slope of the fit. In an example calculating the effective wheelbase length comprises determining a distance from the fifth wheel coupling to a line that contains an instant center of the trailer relative to the ground. In an example determining a distance from the fifth wheel coupling to a line that contains the instant center of the trailer relative to the ground comprises determining the boom angle and derivatives of the boom angle and the trailer angle. In an example the effective wheelbase length is calculated based on the boom length, the boom angle, and the derivatives of the boom angle and the trailer angle.

Some examples include one of the above and/or below features, or any combination thereof. In an example the trailer has a front landing gear that is configured to support the front of the trailer off of the ground, and wherein the trailer angle is determined by determining an angle of the fifth wheel coupling when the landing gear is off of the ground. In an example the angle of the boom is determined with a first inclinometer and the angle of the trailer is determined with a second inclinometer. In an example determining an angle of the boom comprises determining changes in the boom angle as the boom is pivoted, determining an angle of the trailer comprises determining changes in the trailer angle as the boom is pivoted, and calculating the effective wheelbase length comprises estimating a wheelbase length based on the changes in boom angle, the changes in trailer angle, and the length of the boom.

Some examples include one of the above and/or below features, or any combination thereof. In some examples the method further includes calculating the effective wheelbase length at a plurality of different boom and trailer angles, and storing data that relates to the boom angles, the trailer angles, and the corresponding effective wheelbase lengths. In some examples the method further includes using the stored data in an autonomous driving control system that is configured to transport the trailer by moving the tractor. In an example the method further includes monitoring the trailer angle as the tractor is being moved by the autonomous driving control system, and updating the effective wheelbase length used by the autonomous driving control system as a function of the monitored trailer angle. In an example the method further includes analyzing the stored data that relates to effective wheelbase lengths and determining a boom angle to use for transporting the trailer and an associated effective wheelbase length to use for the autonomous driving control system, wherein the boom angle is determined by identifying a region in the data where a variation of the effective wheelbase length as a function of boom angle is relatively lower than in other regions in the data. In an example the method further includes retrieving from the stored data a predetermined effective wheelbase length that corresponds to at least one of a current boom angle and a current trailer angle.

In another aspect, a method of estimating an effective wheelbase length of a trailer that is carried by a tractor and is configured to be moved along the ground, wherein the tractor comprises a fifth wheel coupling that is configured to be connected to a kingpin of the trailer, wherein a height of the fifth wheel coupling is adjustable by adjustment of an angle of a boom that carries the fifth wheel coupling and wherein the boom has a length, includes determining a change in angle of the boom as the boom is pivoted, determining a change in angle of the trailer as the boom is pivoted, and calculating the effective wheelbase length based on the determined change in boom angle, the determined change in trailer angle, and the boom length.

In another aspect, a method of estimating an effective wheelbase length of a trailer that is carried by a tractor and is configured to be moved along the ground, wherein the tractor comprises a fifth wheel coupling that is configured to be connected to a kingpin of the trailer, wherein a height of the fifth wheel coupling is adjustable by movement of a boom that carries the fifth wheel coupling, includes determining the height of the fifth wheel coupling, determining an angle of the trailer, and calculating the effective wheelbase length based on the determined height of the fifth wheel coupling and the determined trailer angle.

In another aspect, a system for estimating an effective wheelbase length of a trailer that is carried by a tractor and is configured to be moved along the ground, wherein the tractor comprises a fifth wheel coupling that is configured to be connected to a kingpin of the trailer, wherein a height of the fifth wheel coupling is adjustable by adjustment of an angle of a boom that carries the fifth wheel coupling and wherein the boom has a length, includes a first sensor for determining an angle of the boom, a second sensor for determining an angle of the trailer, and a processor that is configured to calculate an effective wheelbase length based on the determined boom angle, the determined trailer angle, and the boom length.

Some examples include one of the above and/or below features, or any combination thereof. In an example determining an angle of the boom comprises measuring the boom angle at a plurality of different heights of the fifth wheel coupling, determining an angle of the trailer comprises measuring the trailer angle at the same plurality of different heights of the fifth wheel coupling, and the effective wheelbase length is calculated based on the length of the boom, the plurality of measured boom angles, and the plurality of measured trailer angles. In an example one or both of a linear fit and a second order polynomial fit is determined of a relationship between the determined trailer angles and the determined boom angles, at multiple different heights of the fifth wheel coupling. In an example a slope of the fit is determined, and the effective wheelbase length is determined based on the boom length and the determined slope of the fit.

Some examples include one of the above and/or below features, or any combination thereof. In an example calculating the effective wheelbase length comprises determining a distance from the fifth wheel coupling to a line that contains the instant center of the trailer relative to the ground. In an example determining a distance from the fifth wheel coupling to a line that contains an instant center of the trailer relative to the ground comprises determining the boom angle and derivatives of the boom angle and the trailer angle. In an example the effective wheelbase length is calculated based on the boom length, the boom angle, and the derivatives of the boom angle and the trailer angle. In an example the first sensor comprises a first inclinometer and the second sensor comprises a second inclinometer.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein. References to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only the singular. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1A:
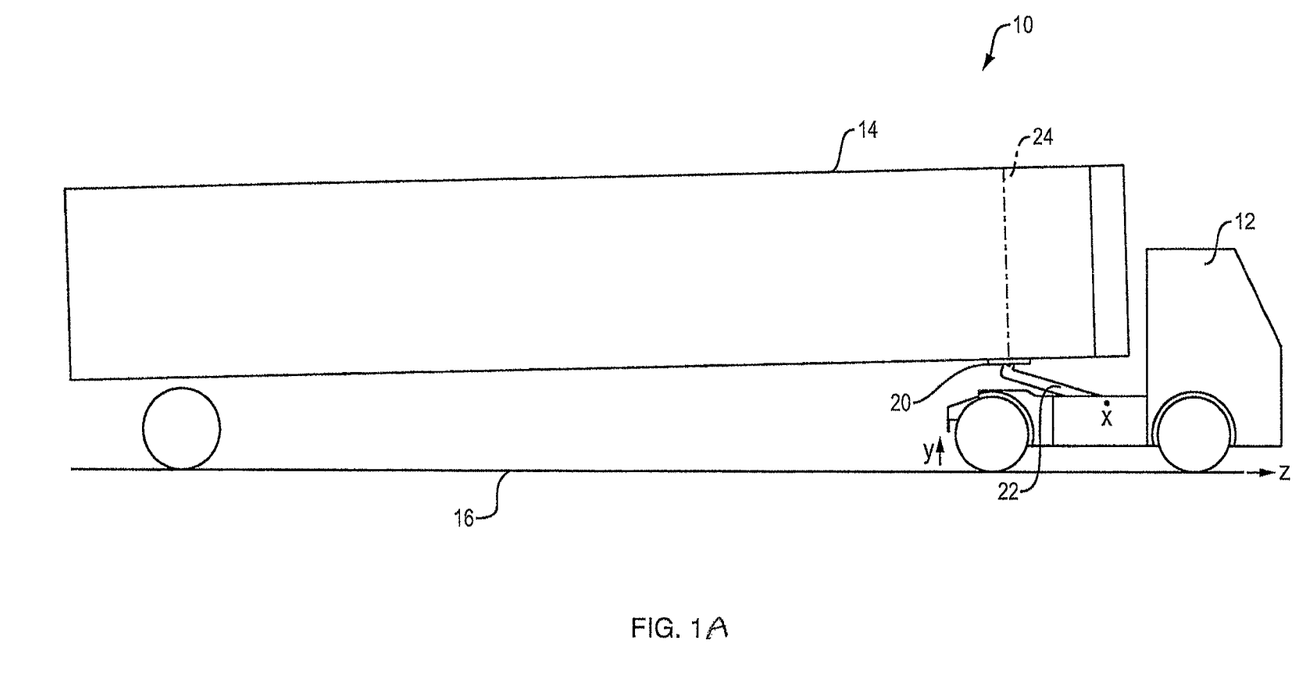
FIG. 1A is a side view of a tractor-trailer combination.

FIG. 1A is side view of a tractor-trailer combination 10, illustrating tractor (sometimes called a "truck") 12 connected to and ready to pull trailer 14 along ground 16. As is known in the field, this connection is typically accomplished by connecting the tractor's fifth wheel coupling 20 to the trailer kingpin (not shown). This establishes a trailer rotational axis 24. The height of fifth wheel coupling 20 (which is carried at the distal end of boom 22) can be controlled by controlling the angle of hydraulic boom 22. For ease of reference herein, spatial axes x (lateral horizontal axis), y (vertical axis), and z (forward and aft longitudinal axis) are identified.

Figure 1B:
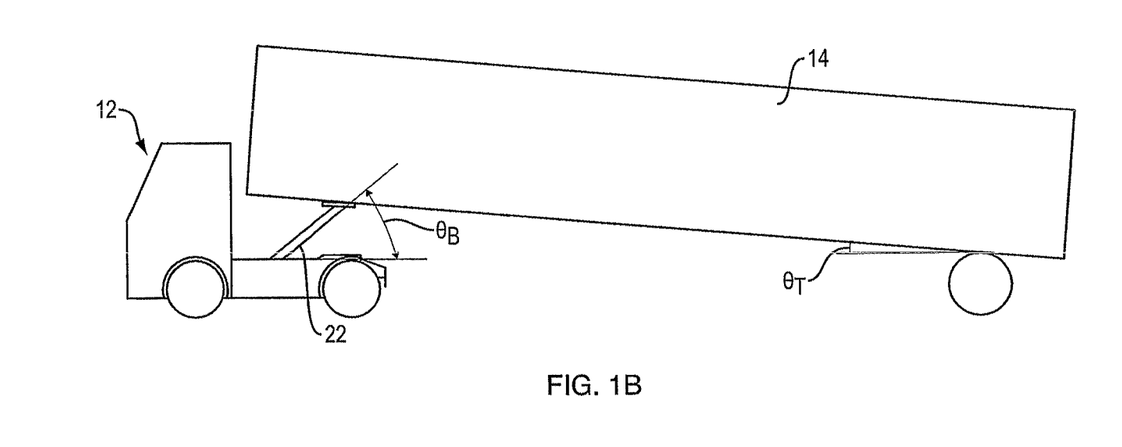
FIG. 1B is a schematic side view of a tractor-trailer combination, illustrating a boom angle and a trailer angle that are useful in understanding aspects of this disclosure.

FIG. 1B is a similar view, wherein the angle of boom 22 relative to the horizontal (the nominal ground plane), $\Theta_B$, is identified, as is the angle of the trailer relative to the horizontal, $\Theta_T$. In examples described herein the boom and trailer angles can be determined by any desired measurement devices or systems, including but not limited to inclinometers. In some examples an inclinometer is mounted to the boom for determination of boom angle, and an inclinometer is mounted to the tractor's fifth wheel coupling to determine trailer angle (the fifth wheel coupling being parallel to the bottom of the trailer when the fifth wheel coupling is secured to the trailer kingpin), or this inclinometer could be mounted to the trailer itself. Mounting to the fifth wheel coupling may be preferable since this keeps all sensing instrumentation on the tractor, which simplifies the arrangement of the trailer (as the trailer does not require power and data transfer capabilities for the sensor). Also, this allows an instrumented tractor to be used with various trailers, without requiring sensing instrumentation on any of the trailers. These two angles could alternatively be determined by any one or more of different direct measurement sensors such as inertial measurement units (IMUs) or optical encoders that are configured to measure angles in pivoting joints, or with indirect sensors such as LIDAR sensors, ultrasonic sensors, radar sensors, and other ranging sensors known in the field, as several non-limiting examples. LIDAR sensors mounted to the tractor, and other sensors that are able to sense the rear corners of the trailer, can collect data that can be used to estimate the trailer length as disclosed in PCT patent application PCT/US2021/059547, filed on Nov. 16, 2021, the disclosure of which is incorporated herein by reference, for all purposes. Such LIDAR sensors can be used to determine one or both angles. Also, LIDAR sensors or other ranging sensors can be used to determine the height of the fifth wheel coupling.

Figure 1C:
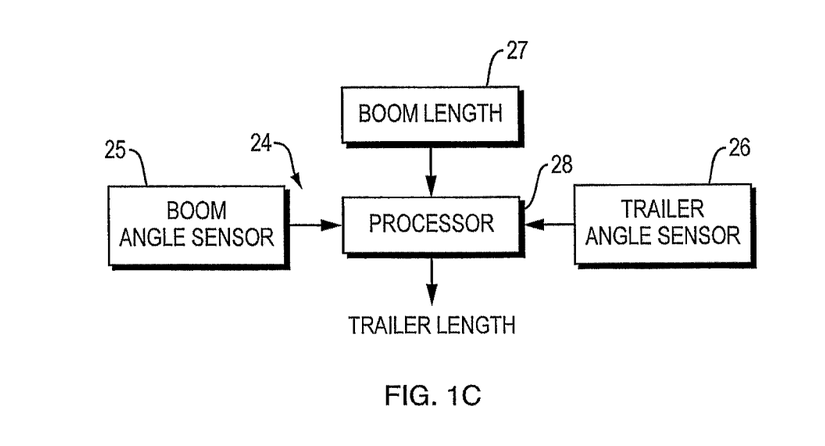
FIG. 1C is a block diagram of a system for determining the effective length of a trailer wheelbase.

FIG. 1C illustrates system 24 for estimating/determining the effective trailer wheelbase length. The effective trailer wheelbase length may be determined using processor 28 that in some examples is input with the boom length 27, the boom angle 25, and the trailer angle 26. In some examples the angle determination sensors and the processor are carried by the tractor, although any or all of these can be located elsewhere, including but not limited to the trailer. In other examples, indirect sensors are mounted on structures that are close to the tractor-trailer. Also, processing can be accomplished remotely (e.g., in the cloud) and wired or wireless communication can be used to communicate with the processor.

Figure 2:
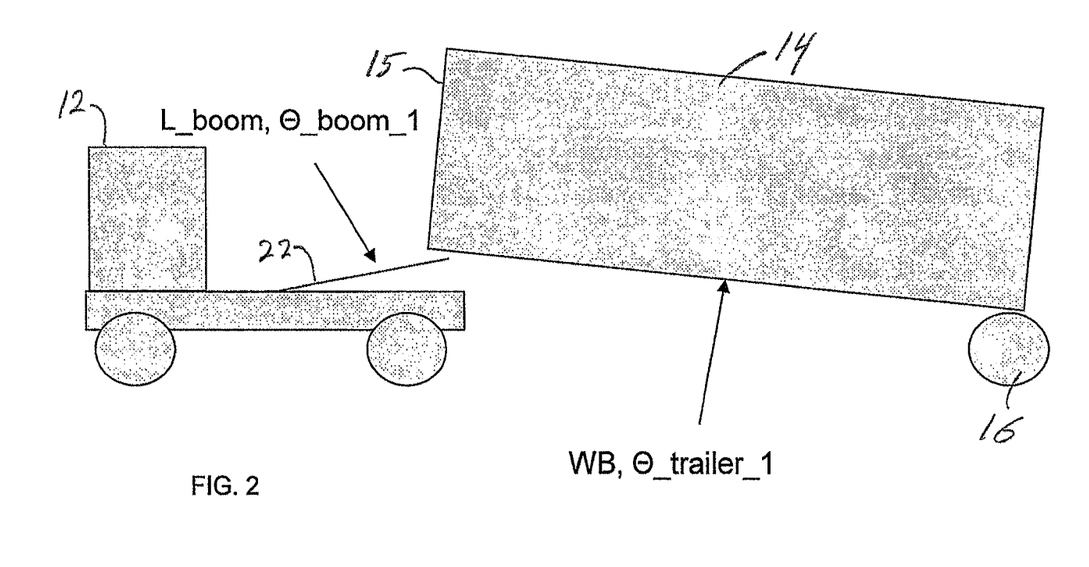
FIGS. 2 and 3 are further schematic side views of a tractor-trailer combination at two different trailer heights, illustrating a boom length, a boom angle, a trailer wheelbase length, and a trailer angle that are useful in understanding aspects of this disclosure.
Figure 3:
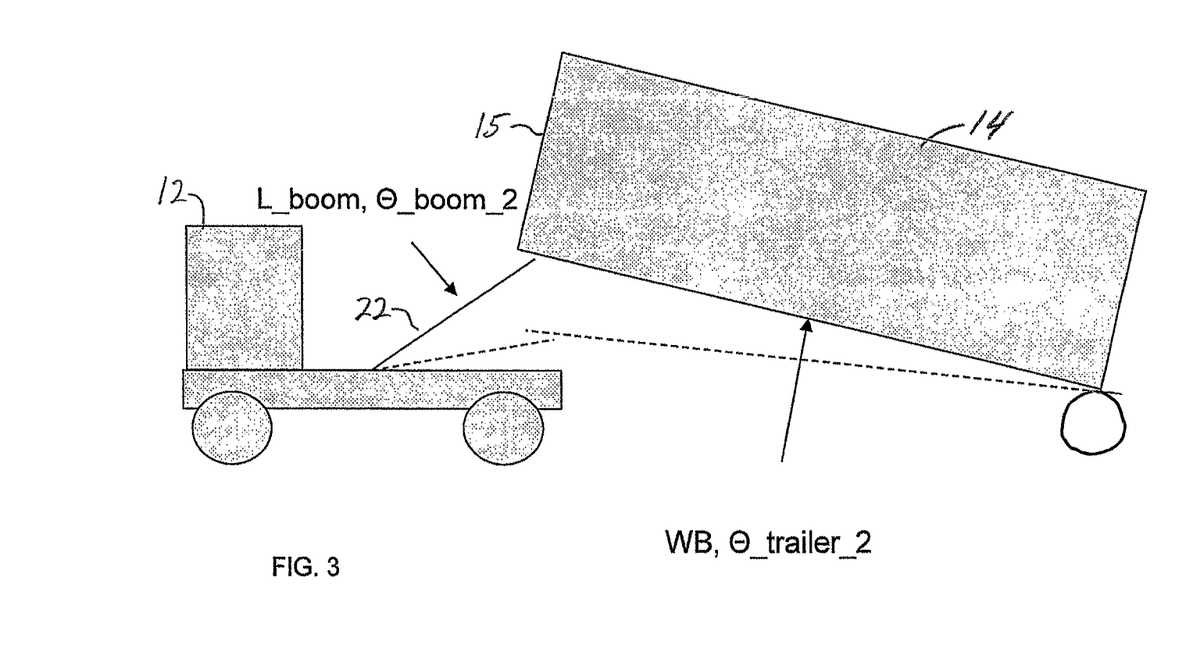
Figure 4:
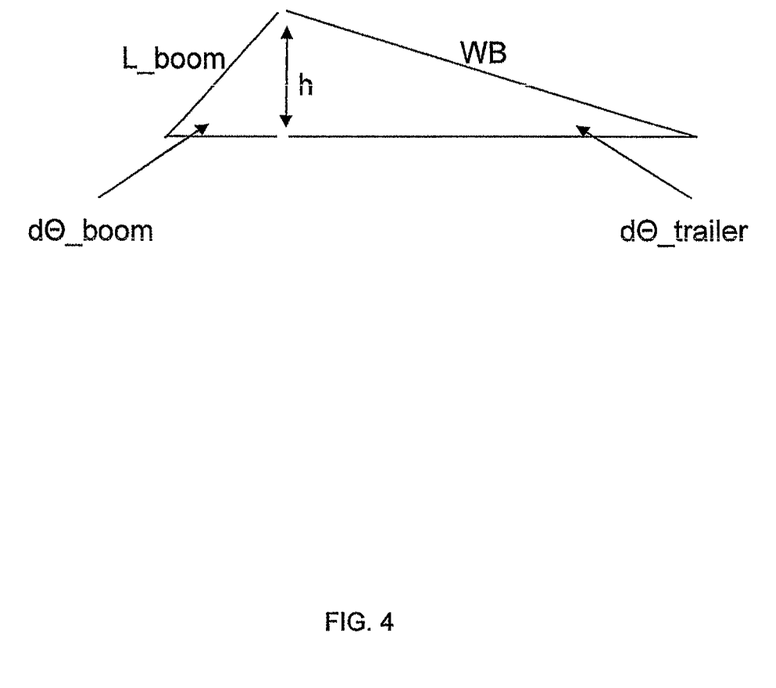
FIG. 4 includes a simplified triangle representation of the configurations of FIGS. 2 and 3.

The bases of various effective trailer wheelbase length determination methodologies described herein may be better understood with reference to FIGS. 2, 3, and 4. Trailer 14 is carried by tractor boom 22 via the fifth wheel coupling being connected to the trailer's kingpin, neither shown in these simplified views. Boom 22 has a known length. Boom 22 is in most cases an hydraulic lever that pivots about its coupling to tractor 12 as its angle relative to the horizontal is changed, which moves the front 15 of trailer 14 up and down, as illustrated in FIGS. 2 and 3. In simplified terms, as the trailer is lifted and lowered it essentially pivots on its rear wheels 16 or a location close to or proximate its rear wheels. More specifically, in some effective wheelbase estimations there is an effective contact patch of the rear tires of the trailer with the ground. There is a virtual pivot point located above or below the effective contact patch. The trailer can pivot about a point that is above or below the surface of the ground. The trailer rotates around that virtual pivot point. The effective contact patch can move as the trailer is raised and lowered, in part because the horizontal distance between the trailer's wheels and the tractor's wheels changes as the trailer is raised and lowered. Also, the pivot point moves due to the kinematics of the rear suspension of the trailer.

As the trailer is lifted up the boom angle and the trailer pitch angle both increase, as depicted in FIG. 3. For single-axle trailers, in some examples a reference effective trailer wheelbase length, abbreviated "WB," may be but need not be defined as the length of the trailer from the kingpin to a point directly above the rear wheels, or the rear wheel axle; this point is a proxy for the point (or perhaps the area, patch, or the location) about which the trailer pivots as it is moved up and down by the boom. For multiple-axle trailers, in some examples an effective wheelbase length can be defined generally as the distance from the kingpin to a point between the front-most and rear-most axles about which the trailer rotates in yaw (i.e., laterally) while in motion.

As illustrated in FIG. 4 and in equations (1) and (2) below, an approximate virtual or effective trailer wheelbase length (WB) can be calculated/estimated from the boom angle, the trailer angle, and the boom length. Because the effective trailer wheelbase length may vary as a function of the height of the fifth wheel coupling, the quantity used for the effective trailer wheelbase length by the autonomous controller to command motion of the tractor to effect motion of the connected trailer may correspond with the height (h) of the fifth wheel coupling.

Equations (1) and (2) below can be used to determine an approximate effective or virtual trailer wheelbase length from the boom length, boom angle, and trailer angle as shown for example in FIG. 4.

$$L\_boom*\sin(d\Theta\_boom)=h=WB*\sin(d\Theta\_trailer) \quad (1)$$

$$WB=L\_boom*\sin(d\Theta\_boom)/\sin(d\Theta\_trailer) \quad (2)$$

In another example height h is measured rather than derived from angle data and boom length, in which case it may not be necessary to measure or determine the boom angle and/or the boom length. Per equation (1), if h is known WB can be calculated based on h and the trailer angle data. As described above, the height of the fifth wheel coupling can be measured by a ranging sensor. In some examples the ranging sensor(s) are mounted to the tractor in such a manner that they are able to sense the fifth wheel coupling. Height h can then be determined using these ranging sensor(s).

Figure 5:
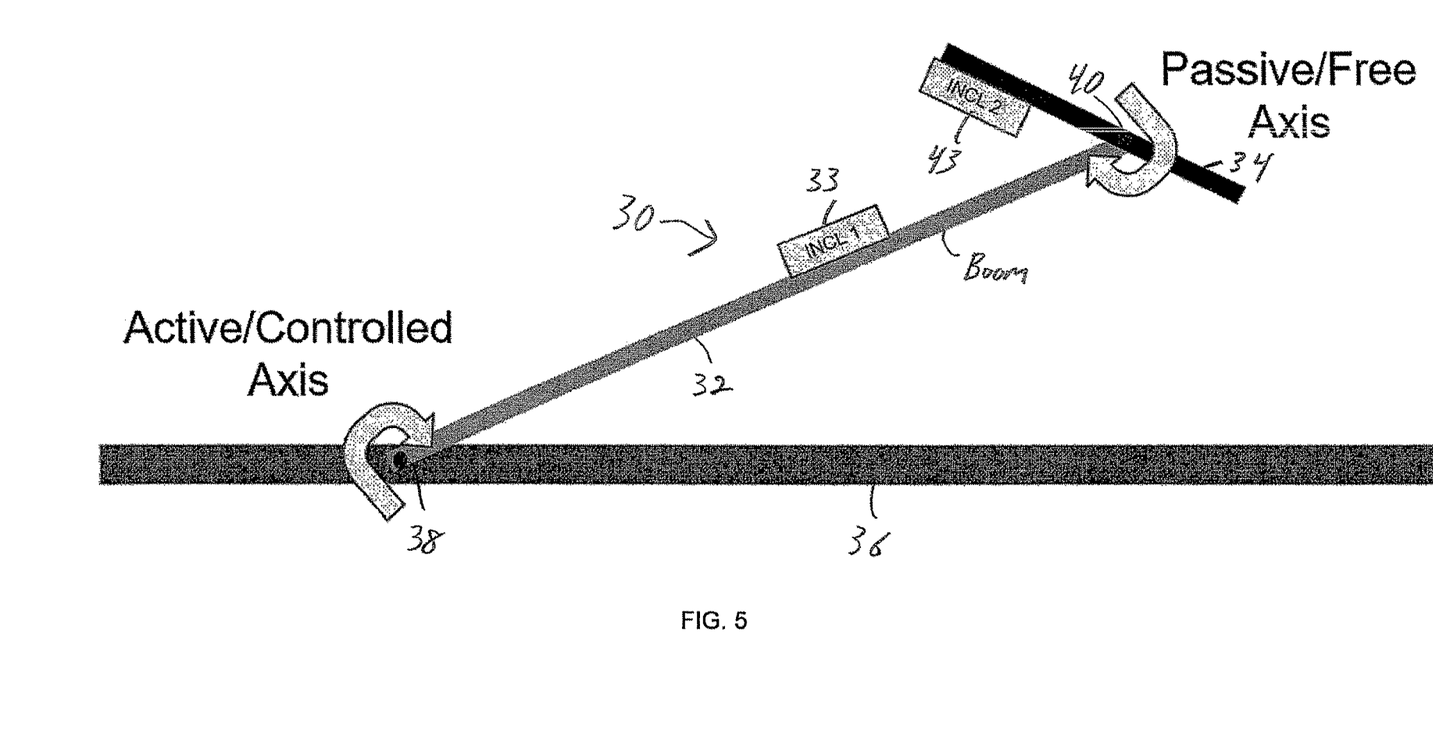
FIG. 5 schematically illustrates a sensor layout for determining boom angle and trailer angle.

FIG. 5 schematically illustrates a first inclinometer 33 mounted to boom 32 that pivots about horizontal pivot axis 38 relative to the tractor frame 36, and a second inclinometer 43 mounted to fifth wheel coupling 34 that is carried at the end of boom 32, and is configured to be coupled to the trailer's kingpin (not shown), as is known in the field. Fifth wheel coupling 34 is free to passively pivot relative to boom 32 about horizontal axis 40. As described elsewhere herein, instruments other than inclinometers can be used to measure or determine the boom angle and the trailer angle.

Figure 6:
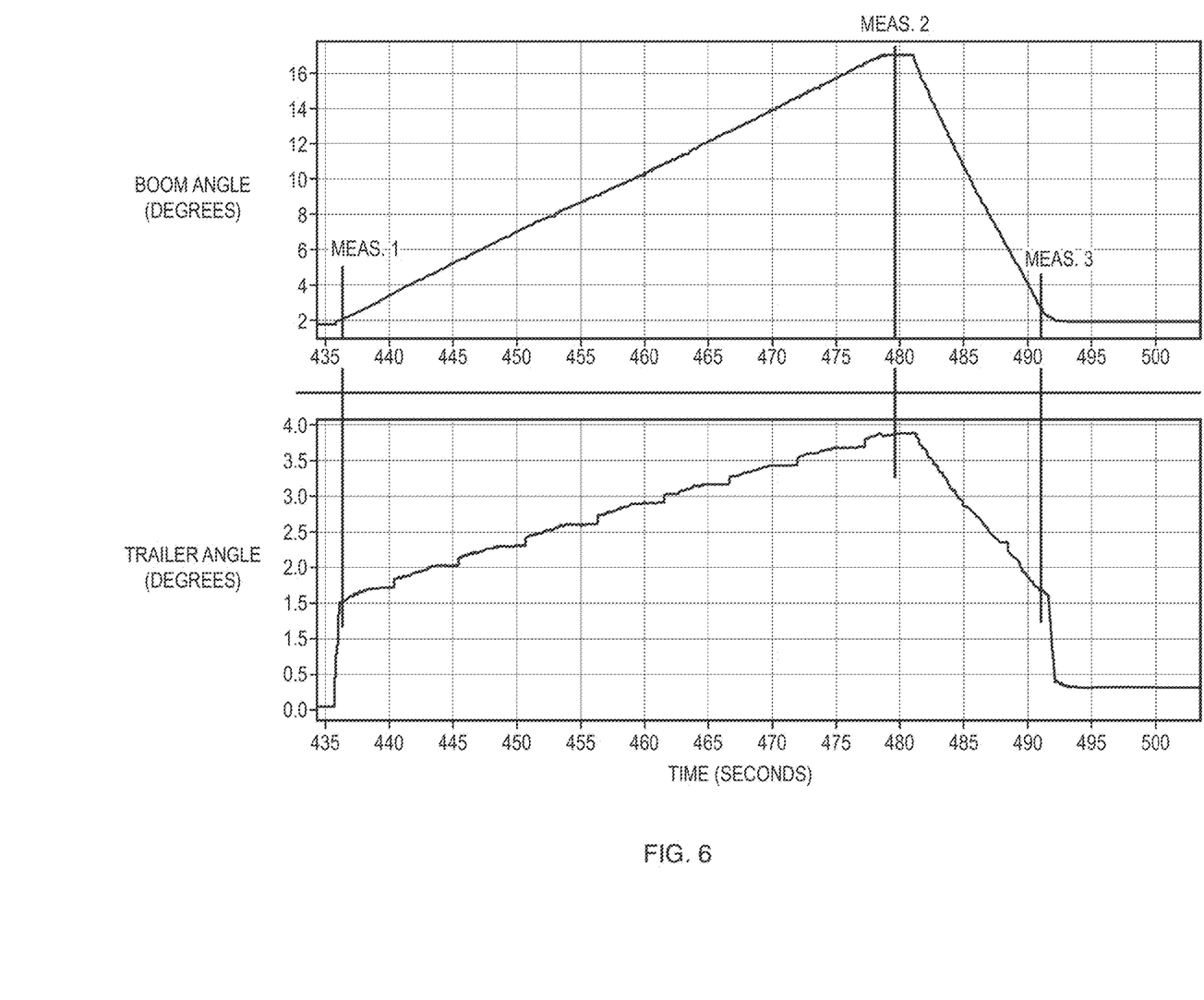
FIG. 6 presents measured data of the boom angle and the trailer angle using the sensors of FIG. 5.

FIG. 6 presents boom angle and trailer angle data measured using the inclinometers of FIG. 5, over one cycle of the trailer being lifted up from its lowest position (where the front of the trailer is supported on the ground by landing gear (not shown), as is known in the field, to a certain height. The slope of the lifting curve is less than that of the lowering curve because an hydraulic pump is used for the lifting, while simple pressure release is used for the lowering. As explained in more detail elsewhere herein, the effective wheelbase calculation may be more accurate if multiple separate boom and trailer angle measurements are used as the basis for the wheelbase calculation. In some examples inclinometers return data at about 100 Hz, and perhaps 1-2 seconds of data (or more) can be used in the calculations. An accurate effective wheelbase estimation can be made over a small change in boom angle, depending in part on the accuracy of the inclinometers.

As set forth in equations (1) and (2) and with reference to FIG. 4, the calculation of trailer effective wheelbase length may rely on the derivatives of the measured angle(s). Thus, in some examples the trailer effective wheelbase length is based on the boom length, changes in boom angle, and resultant changes in trailer pitch angle. The boom and trailer angles and/or the change in angles can be determined during normal operation of an autonomous tractor/trailer coupling, operation, and uncoupling system, as part of the automated connection to, raising and transport of the trailer. For at least some of the effective trailer wheelbase length determination methods described herein, using derivatives obviates any need for the tractor and trailer to be on level ground, or even to be on the same sloped plane. Since the effective trailer wheelbase length estimation is autonomous and conducted without human input or intervention, not requiring any particular pitch angle for the tractor and/or trailer in order to calculate effective trailer wheelbase length provides greater latitude to the use of the effective wheelbase length estimation systems and methods.

Figure 7:
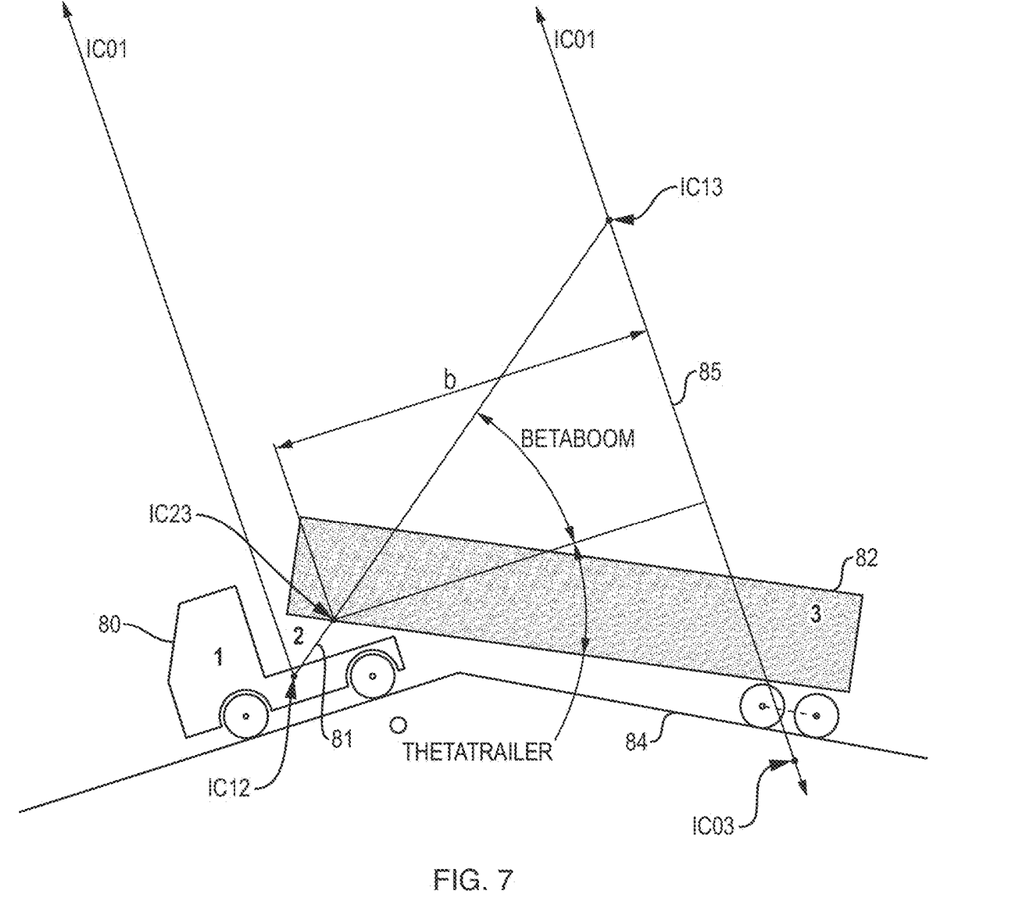
FIG. 7 is a schematic side view of a tractor-trailer combination, illustrating several tractor-trailer variables that are useful in understanding aspects of this disclosure.

FIG. 7 relates to another effective trailer wheelbase length calculation methodology wherein the "instant center" of the trailer is determined. The effective wheelbase length of the trailer can be used by the navigation system to guide the tractor/trailer combination as it moves along the ground. This methodology is generally more accurate than the methodologies described previously since knowing the trailer instant center fully defines the trailer's path.

An instant center may be defined as the point about which a body is rotating at any given time as the body moves. There is only one instant center at any given time, but the instant center can change over time. In the present case, the trajectory of the trailer can be determined based on the instant center of the trailer relative to the ground on which it is moving or to be moved. FIG. 7 illustrates tractor 80 connected to trailer 82 by boom 81. The tractor and trailer are both on ground 84. The slope of ground 84 is exaggerated to assist with clarity of illustration. In this example, the trailer wheels are locked as the boom is pivoted, thus changing the angle of the trailer relative to the ground. This methodology can be accomplished by raising/lowering the trailer while it is parked. In other examples the angles can be measured while the tractor is parked and the trailer is free to move, and/or while both the tractor and trailer are free to move. In some examples data is collected during normal operation of an autonomous tractor in a yard, where the tractor couples with, lifts, moves, and then lowers the trailer. In the below derivation of the trailer instant center, and with reference to FIG. 7, the ground is identified as body "0", tractor 80 as body "1", boom 81 as body "2", and trailer 82 as body "3."

Using this identification convention, relevant instant centers are identified as follows:

IC01—Instant center of the Tractor relative to the ground (located at a point infinitely far away along the y axis of the Tractor Coordinate System)

IC02—Instant center of the Tractor's Boom relative to the ground

IC03—Instant center of the Trailer relative to the ground (this is the value that is desired to be used as the effective trailer wheelbase length)

IC12—Instant center of the Tractor's Boom relative to Tractor

IC23—Instant center of the Tractor's boom relative to the Trailer

IC13—Instant center of the Trailer relative to the Tractor $\Theta_{boom}$ is the measured angle of the tractor boom determined in the reference frame of the tractor. This measures close to 0° when the boom is all the way down.

$\beta_{boom}$ is the angle from the pivot point of the tractor boom to the fifth wheel pivot. In an exemplary tractor, this measures about 4.71° when the boom is all the way down.

Accordingly, $\beta_{boom}=\Theta_{boom}+\varphi_{boom}$, where $\varphi_{boom}=4.71°$. $\varphi_{boom}$ is a measured constant value, namely the angle of a line from the tractor boom pivot to the fifth wheel pivot when the boom is all the way down.

When the trailer wheels are locked while the boom is raised and lowered, the tractor will translate along the ground. This means that the instant center of the tractor relative to the ground (IC01) lies infinitely far away on a line perpendicular to the tractor's bed passing through the boom pivot axis.

The instant center of the boom IC02 must lie on a line connecting IC01 and IC12. The instant center of the boom IC02 must also lie on a line connecting the instant center of the 5th wheel pivot IC23 and the instant center of the trailer IC03.

It is the instant center of the trailer IC03 that is sought because the line of action of the force being exerted by the trailer on the ground will pass though this point.

The dimension "b" is the distance from the 5th wheel's pivot axis to a line 85 that contains the instant center of the trailer with respect to the ground IC03. Line 85 also contains instant center IC01. In some examples distance b is used by the autonomous system as the effective trailer wheelbase length.

Dimension b can thus be determined as follows:

$$b = L_{boom} * \cos(\beta_{Boom}) \frac{d\beta_{boom}}{d\theta_{trailer}}$$

Accordingly, the trailer's effective wheelbase length (b) can be determined based on the boom length, the boom angle, and derivatives of the boom angle and the trailer angle. Measuring the boom and trailer angles as the boom is raised and/or lowered thus provides the information needed to calculate the instant center of the trailer, which can be used by the autonomous navigation system to maneuver the trailer through a yard or other location. In other examples and as described above the height (h) of the fifth wheel coupling is directly measured rather than relying on boom length and boom angle to derive h. The equations for the calculation of dimension b using measured height h can be derived from the above discussion of the instant-center based derivation of b using the boom length and boom angle. In an example, if the boom length is known $\theta_{boom}$ and $\varphi_{boom}$ can be calculated from the height h of the fifth wheel coupling/pivot.

Figure 8:
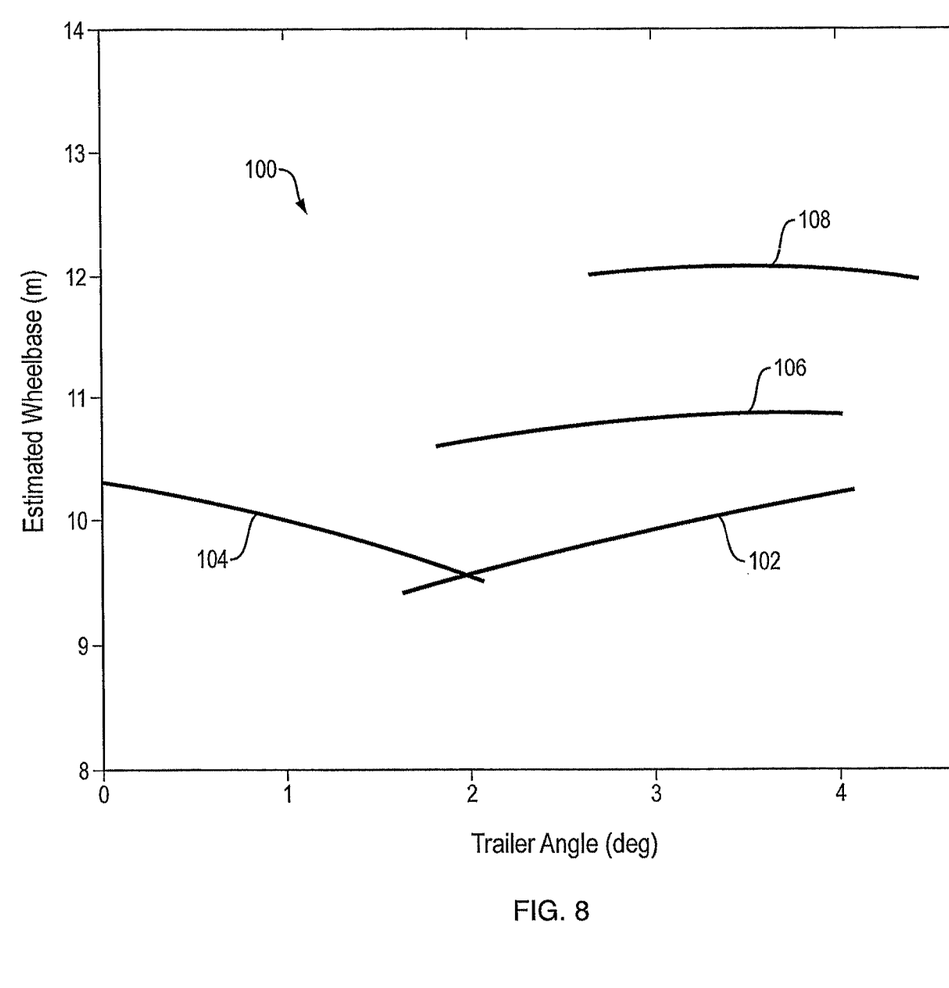
FIG. 8 provides data for the variation in calculated estimated effective trailer wheelbase length across ranges of trailer angles for four exemplary trailers.

FIG. 8 provides data 100 for the variation in calculated estimated trailer effective wheelbase (in meters) across ranges of trailer angles for four exemplary trailers, curves 102, 104, 106, and 108. The curves do not necessarily represent movement through the entire range of the boom's range of motion. As can be seen the effective wheelbase in some cases varies quite a bit as the trailer angle changes, and in other cases the variation is minimal. Also, in some cases the effective wheelbase exhibits a maximum or a minimum and in other cases it does not. Different illustrated curves may have been obtained with boom raises over different ranges. In some examples data that relates wheelbase estimate to one or both of trailer angle and boom angle is measured and stored.

In some examples the effective wheelbase that can be used for autonomous driving control is developed by raising the boom over less than its full range. As shown in FIG. 6, the inclinometer data can be noisy. Fitting a line or a polynomial to the inclinometer data can help to reduce noise and provide a cleaner fit. In some cases only two data points are needed to calculate the wheelbase. However, due to the dirtiness of the data and the lack of precision in truck/trailer systems (e.g., weak contact points, joint compliances, etc.) more than two data points may be needed to get a good fit.

In some examples inclinometers have a resolution of 0.01 degrees and an accuracy of 0.1 degrees. The total boom raise range is typically over about an 18 degree range, and the trailer moves about 2-4 degrees over the boom raise, depending on its length. The boom raise takes up to 30 seconds. If the inclinometers are sampled at 100 Hz, about 3000 samples can be obtained, which is likely more than is needed for the wheelbase calculation. Accordingly in many cases it will be sufficient to raise the boom over less than its full range of motion while collecting angle data.

In examples such as curve 108 FIG. 8, where the wheelbase estimate remains fairly constant over a range of travel, movement over the full range is less important to gathering enough data for a good fit. But if the wheelbase estimate is more variable, as in curve 104 FIG. 8, then a wider range of travel is needed to develop accurate wheelbase estimates. In some examples a minimum set of conditions that provide sufficient information for a useful estimate are identified and used in the data gathering process wherein the boom is raised over at least a certain range. Note that these data can be gathered when the trailer is first picked up by the truck, and/or at other times while the trailer is coupled to the truck. In examples herein all measured and calculated data is stored in memory. Data can be retrieved from stored memory for use by the autonomous driving system.

In examples herein the autonomous control system maintains data on boom angle, trailer angle, and corresponding effective wheelbase length. The autonomous control system can use these data to maneuver the trailer. In some examples the system can set a boom angle (or boom height) or a trailer angle and retrieve the stored effective wheelbase estimate that corresponds to the set angle. In some examples a boom or trailer angle is selected where the variation of the effective wheelbase estimate is minimized. In some examples the effective wheelbase estimation data is used to determine a desired boom angle. In some examples the system dynamically determines changes in trailer angle as the trailer is in motion and updates the effective wheelbase estimate accordingly. In some examples the effective wheelbase length is retrieved based on the measured boom height (angle). The autonomous system can alter the effective wheelbase estimate depending on the boom height selected for transporting the trailer. Also, the relationship of the wheelbase and boom height can be used to determine an accurate effective wheelbase if the boom height changes as the tractor is driven. This can help to maintain greater driving accuracy.

As described herein, effective trailer wheelbase length can be estimated in several manners and/or using different types of sensors, such as inclinometers and LIDARs. Fusing multiple estimates could yield more accurate results by exploiting the strengths of different methods. The multiple estimates can use the same sensors, or not. For example, as described herein effective trailer wheelbase length can be estimated by different methods, using inclinometers mounted to the boom and the fifth wheel coupling. Also, multiple effective trailer wheelbase length estimations can be based on the use of different sensors, such as inclinometers, accelerometers, or IMUs for direct angle or change of angle measurements, and cameras, LIDARS, or other types of ranging sensors for indirect measurements of the trailer. For example, an estimation based on changes in boom and trailer angle as described above can be developed initially, when the tractor first picks up the trailer. Data developed from indirect sensors that operate during motion of the tractor/trailer, such as LIDAR sensors, as disclosed in the application incorporated by reference herein, can achieve a more accurate estimate but may require more data and therefore take longer.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Functions, methods, and/or components of the methods and systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuits) (ASIC), general computing processor(s), micro-controller(s), and the like, or any combination of these, may be suitable, and may include analog or digital circuit components and/or other components with respect to any particular implementation.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of determining an effective wheelbase length of a trailer that is carried by an autonomous tractor and is configured to be moved along the ground, wherein the tractor comprises an autonomous driving control system, a fifth wheel coupling that is configured to be connected to a kingpin of the trailer, wherein a height of the fifth wheel coupling is adjustable by adjustment of an angle of a boom that carries the fifth wheel coupling and wherein the boom has a length, and the tractor further comprises a first sensor that is configured to determine an angle of the boom and a second sensor that is configured to determine an angle of the trailer, the method comprising:
  operating the autonomous driving control system to change the height of the fifth wheel coupling and thus change the height of the trailer;
  using the first sensor to determine the angles of the boom at a plurality of different heights of the fifth wheel coupling and the trailer;
  using the second sensor to determine the angles of the trailer at the same plurality of different heights of the fifth wheel coupling and the trailer; and
  using a processor to calculate the effective wheelbase length based on the determined boom angles, the determined trailer angles, and the boom length.

2. The method of claim 1, wherein the trailer comprises a set of rear wheels carried by a rear axle, and the effective wheelbase length comprises the trailer wheelbase length from the kingpin to a location proximate the rear axle.

3. The method of claim 1, wherein using the processor to calculate the effective wheelbase length comprises determining a distance from the fifth wheel coupling to a line that contains an instant center of the trailer relative to the ground.

4. The method of claim 3, wherein determining a distance from the fifth wheel coupling to a line that contains the instant center of the trailer relative to the ground comprises determining derivatives of a boom angle and a trailer angle.

5. The method of claim 4, wherein the effective wheelbase length is calculated based on the boom length, the boom angle, and the derivatives of the boom angle and the trailer angle.

6. The method of claim 1, wherein the trailer has a front landing gear that is configured to support the front of the trailer off of the ground, and wherein the trailer angle is determined by determining an angle of the fifth wheel coupling when the landing gear is off of the ground.

7. The method of claim 1, wherein the first sensor comprises a first inclinometer and the second sensor comprises a second inclinometer.

8. The method of claim 1, wherein using the first sensor to determine angles of the boom comprises determining changes in the boom angle as the boom is pivoted, using the second sensor to determine angles of the trailer comprises determining changes in the trailer angle as the boom is pivoted, and using the processor to calculate the effective wheelbase length comprises estimating a wheelbase length based on the changes in boom angle, the changes in trailer angle, and the length of the boom.

9. The method of claim 1, wherein using the processor to calculate the effective wheelbase length comprises calculating the effective wheelbase length at a plurality of different boom and trailer angles, and storing data that relates to the boom angles, the trailer angles, and the corresponding effective wheelbase lengths.

10. The method of claim 9, further comprising using the stored data in the autonomous driving control system by using the autonomous driving control system to transport the trailer by moving the tractor.

11. The method of claim 10, further comprising monitoring the trailer angle as the tractor is being moved by the autonomous driving control system, and updating the effective wheelbase length used by the autonomous driving control system as a function of the monitored trailer angle.

12. The method of claim 10, further comprising analyzing the stored data that relates to effective wheelbase lengths and determining a boom angle to use for transporting the trailer and an associated effective wheelbase length to use for the autonomous driving control system, wherein the boom angle is determined by identifying a region in the data where a variation of the effective wheelbase length as a function of boom angle is relatively lower than in other regions in the data.

13. The method of claim 9, further comprising retrieving from the stored data a predetermined effective wheelbase length that corresponds to at least one of a current boom angle and a current trailer angle.

14. A method of determining an effective wheelbase length of a trailer that is carried by an autonomous tractor and is configured to be moved along the ground, wherein the tractor comprises an autonomous driving control system, a fifth wheel coupling that is configured to be connected to a kingpin of the trailer, wherein a height of the fifth wheel coupling is adjustable by adjustment of an angle of a boom that carries the fifth wheel coupling and wherein the boom has a length, and the tractor further comprises a first sensor that is configured to determine an angle of the boom and a second sensor that is configured to determine an angle of the trailer, the method comprising:
   operating the autonomous driving control system to pivot the boom and thus change the height of the fifth wheel coupling and the height of the trailer;
   using the first sensor to determine changes in angle of the boom as the boom is pivoted;
   using the second sensor to determine changes in angle of the trailer as the boom is pivoted; and
   using a processor to calculate the effective wheelbase length based on the determined changes in boom angle, the determined changes in trailer angle, and the boom length.

15. A method of determining an effective wheelbase length of a trailer that is carried by an autonomous tractor and is configured to be moved along the ground, wherein the tractor comprises an autonomous driving control system, a fifth wheel coupling that is configured to be connected to a kingpin of the trailer, wherein a height of the fifth wheel coupling is adjustable by movement of a boom that carries the fifth wheel coupling, and the tractor further comprises a sensor that is configured to determine an angle of the trailer, the method comprising:
   operating the autonomous driving control system to pivot the boom and thus change the height of the fifth wheel coupling and the height of the trailer;
   determining the height of the fifth wheel coupling at a plurality of different heights of the fifth wheel coupling;
   using the sensor to determine the angles of the trailer at the same plurality of different heights of the fifth wheel coupling; and
   using a processor to calculate the effective wheelbase length based on the determined heights of the fifth wheel coupling and the determined trailer angles.

16. A system for determining an effective wheelbase length of a trailer that is carried by an autonomous tractor and is configured to be moved along the ground, wherein the tractor comprises a fifth wheel coupling that is configured to be connected to a kingpin of the trailer, wherein a height of the fifth wheel coupling is adjustable by adjustment of an angle of a boom that carries the fifth wheel coupling and wherein the boom has a length, the system comprising:
   an autonomous driving control system that is configured to be operated to change the height of the fifth wheel coupling and thus the height of the trailer;
   a first sensor for determining angles of the boom at a plurality of different heights of the fifth wheel coupling and the trailer;
   a second sensor for determining angles of the trailer at the same plurality of different heights of the fifth wheel coupling and the trailer; and
   a processor that is configured to calculate an effective wheelbase length based on the determined boom angles, the determined trailer angles, and the boom length.

17. The system of claim 16, wherein calculating the effective wheelbase length comprises determining a distance from the fifth wheel coupling to a line that contains an instant center of the trailer relative to the ground.

18. The system of claim 17, wherein determining a distance from the fifth wheel coupling to a line that contains the instant center of the trailer relative to the ground comprises determining derivatives of a boom angle and a trailer angle.

19. The system of claim 18, wherein the effective wheelbase length is calculated based on the boom length, the boom angle, and the derivatives of the boom angle and the trailer angle.

20. The system of claim 16, wherein the first sensor comprises a first inclinometer and the second sensor comprises a second inclinometer.

21. The method of claim 1, wherein the processor is part of the autonomous driving control system.

22. The system of claim 16, wherein the processor is part of the autonomous driving control system.

* * * * *